(12) United States Patent
Johansson et al.

(10) Patent No.: US 12,250,463 B2
(45) Date of Patent: Mar. 11, 2025

(54) DYNAMIC CAMERA ROTATION CALIBRATION

(71) Applicant: TOBII AB, Danderyd (SE)

(72) Inventors: Simon Johansson, Danderyd (SE); Mikael Rosell, Danderyd (SE)

(73) Assignee: Tobii AB, Danderyd (SE)

( * ) Notice: Subject to any disclaimer, the term of this patent is extended or adjusted under 35 U.S.C. 154(b) by 229 days.

(21) Appl. No.: 18/127,718

(22) Filed: Mar. 29, 2023

(65) Prior Publication Data

US 2023/0319417 A1  Oct. 5, 2023

(30) Foreign Application Priority Data

Mar. 31, 2022 (SE) ................................ 2250403-9

(51) Int. Cl.
*H04N 23/695* (2023.01)
*G02B 27/01* (2006.01)
(Continued)

(52) U.S. Cl.
CPC ......... *H04N 23/695* (2023.01); *G02B 27/017* (2013.01); *G06F 3/013* (2013.01); *G06V 40/193* (2022.01); *G06V 2201/07* (2022.01)

(58) Field of Classification Search
CPC .. H04N 23/695; H04N 23/611; G02B 27/017; G02B 2027/0178; G02B 27/0172;
(Continued)

(56) References Cited

U.S. PATENT DOCUMENTS

| 9,978,118 | B1 * | 5/2018 | Ozguner | G03H 1/0841 |
| 10,228,562 | B2 * | 3/2019 | Stafford | G02B 27/0172 |

(Continued)

FOREIGN PATENT DOCUMENTS

| WO | WO-2005046465 A1 * | 5/2005 | A61B 3/113 |
| WO | WO-2011117776 A1 * | 9/2011 | A61B 3/113 |
| WO | WO-2016180702 A1 * | 11/2016 | A61B 3/113 |

OTHER PUBLICATIONS

A. Plopski, Y. Itoh, C. Nitschke, K. Kiyokawa, G. Klinker and H. Takemura, "Corneal-Imaging Calibration for Optical See-Through Head-Mounted Displays," in IEEE Transactions on Visualization and Computer Graphics, vol. 21, No. 4, pp. 481-490, Apr. 18, 2015, doi: 10.1109/TVCG.2015.2391857.

(Continued)

*Primary Examiner* — Fernando Alcon
(74) *Attorney, Agent, or Firm* — Christopher Ignatius Moylan

(57) ABSTRACT

The invention is related to a method and arrangement for calibrating the camera of an eye tracking device and compensate for a potential angular offset of the camera. The method comprises: the steps of capturing an eye image of a user, wherein the eye image contains a plurality of glints created by a plurality of illuminators in the eye tracking system; detecting glints in the eye image; projecting illuminator positions onto the eye image to determine expected glint positions; determining an angular offset between expected glint positions and detected glint positions for corresponding pairs of expected and detected glint positions; determining the angular correction for the eye tracking camera using the determined angular offset angle; and applying the angular correction for the eye tracking camera to an eye tracker camera model.

18 Claims, 3 Drawing Sheets

(51) Int. Cl.
*G06F 3/01* (2006.01)
*G06V 40/18* (2022.01)

(58) Field of Classification Search
CPC ........ G02B 2027/0138; G02B 27/0093; G06F 3/013; G06F 3/0325; G06V 40/193; G06V 2201/07; G02F 2203/69; G06T 7/80; G06T 2207/30244; G05B 2219/37009; G05B 2219/39058; A61B 3/113

See application file for complete search history.

(56) References Cited

U.S. PATENT DOCUMENTS

| | | | | |
|---|---|---|---|---|
| 10,417,784 | B1* | 9/2019 | Cavin | G06V 40/19 |
| 10,963,046 | B1* | 3/2021 | Cavin | G06F 3/0346 |
| 2006/0110008 | A1* | 5/2006 | Vertegaal | G06T 7/251 |
| | | | | 382/103 |
| 2007/0171369 | A1 | 7/2007 | Grundig | |
| 2013/0307855 | A1* | 11/2013 | Lamb | G06F 3/013 |
| | | | | 345/473 |
| 2013/0329957 | A1 | 12/2013 | Ebisawa et al. | |
| 2014/0211995 | A1* | 7/2014 | Model | G06F 3/013 |
| | | | | 382/103 |
| 2014/0313308 | A1* | 10/2014 | Wang | G06V 10/145 |
| | | | | 348/78 |
| 2015/0278599 | A1* | 10/2015 | Zhang | G06F 3/013 |
| | | | | 348/78 |
| 2017/0263007 | A1* | 9/2017 | Cavin | G06V 40/18 |
| 2019/0076014 | A1 | 3/2019 | Ryan et al. | |
| 2019/0253700 | A1* | 8/2019 | Tornéus | G02B 27/0093 |
| 2020/0342201 | A1 | 10/2020 | Torsten et al. | |
| 2021/0026445 | A1* | 1/2021 | Stoner | G06F 3/015 |
| 2022/0292718 | A1* | 9/2022 | Dos Santos Mendonca | |
| | | | | G02B 27/0172 |
| 2023/0237703 | A1* | 7/2023 | Ma | G06T 7/70 |
| 2023/0418372 | A1* | 12/2023 | Agaoglu | G06F 3/013 |
| 2024/0094808 | A1* | 3/2024 | Fu | G06V 10/82 |
| 2024/0169679 | A1* | 5/2024 | Kim | G02B 27/141 |
| 2024/0310628 | A1* | 9/2024 | Van Wiemeersch | |
| | | | | H04N 9/3185 |
| 2024/0353923 | A1* | 10/2024 | Nistico | G06V 40/18 |

OTHER PUBLICATIONS

A. Plopski, "Improving Optical-See-Through Experience through Corneal Imaging," Osaka University Knowledge Archive, Jan. 1, 2016, doi: 10.18910/55861.

A. Kar and P. Corcoran, "A Review and Analysis of Eye-Gaze Estimation Systems, Algorithms and Performance Evaluation Methods in Consumer Platforms," in IEEE Access, vol. 5, pp. 16495-16519, Aug. 7, 2017, doi: 10.1109/ACCESS.2017.2735633.

European Search Report regarding EP App. No. 23 16 5141, Jul. 21, 2023.

Swedish Search Report regarding SE App. No. 2250403-9, Dated Nov. 4, 2022.

* cited by examiner

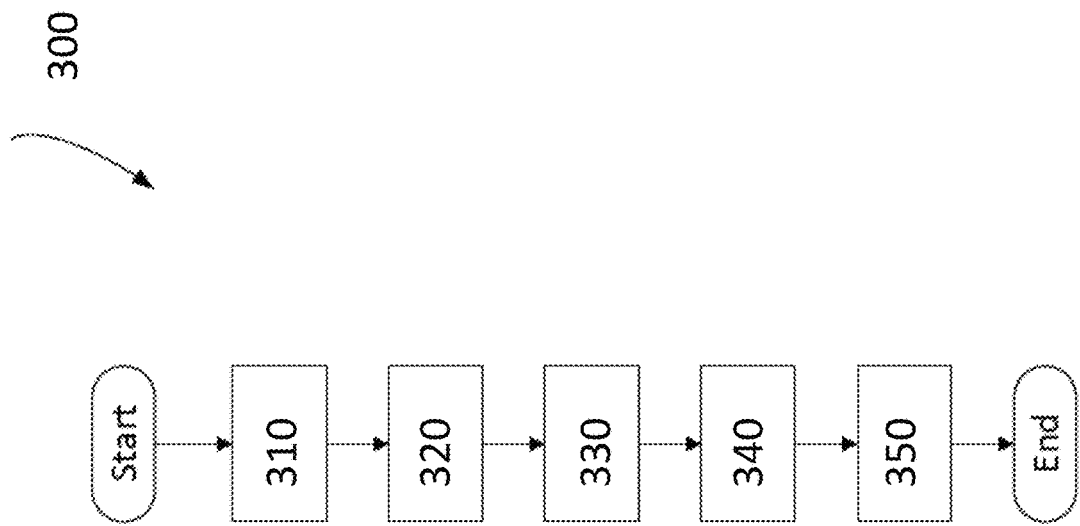

DYNAMIC CAMERA ROTATION CALIBRATION

CROSS-REFERENCE TO RELATED APPLICATION

The present application claims priority to Swedish patent application No. 2250403-9, filed on Mar. 31, 2022, entitled "DYNAMIC CAMERA ROTATION CALIBRATION", and is hereby incorporated by reference in its entirety.

TECHNICAL FIELD

The present invention relates to a method for calibrating an eye tracking capable camera.

BACKGROUND ART

In an eye tracking enabled device such as extended reality head-mounted displays (XR HMD), algorithms are used to create a mathematical camera model to relate between an image space (2D) and world space (3D). Up until now, for XR HMD eye tracking integrations, and the like, the process for calculating the camera model has been to use a hardware calibration rig. An example of such a calibration rig can be found in U.S. Pat. No. 10,928,891 to Rosell, herein incorporated by reference. The calibration process that is part of the HMD production is costly and it also adds to production time and possibly affects a yield rate.

Eye tracking integration with HMDs has shown that the quality of the camera model highly impacts the performance of the eye tracking signal accuracy. Thus, historically, a per unit hardware calibration has been needed to get sufficient eye tracking quality.

It would thus be desirable for some eye tracking integrations to use a default camera model, where no per unit calibration is performed in the production. The main benefit of this would be to reduce cost and complexity of integrating and running the hardware calibration at the production site. The challenge, however, is that for each produced HMD, it will have individual mounting errors due to mounting tolerances. Thus, by using a default calibration, the default camera model used for all HMDs will not perfectly fit each individual HMD.

From simulations and experiments, it has been discovered that the parameter that mostly affects eye tracking signal accuracy is a rotation of the camera around its own axis. Thus, the present invention seeks to mitigate the problem of using the default camera model by adding an algorithm to the eye tracking system that will use data collected during individual user calibration, wherein the system can calibrate the camera rotation dynamically, meaning per user and outside the production site. This process adds no extra user interaction steps except what is already required for an eye model user calibration.

STATEMENTS OF INVENTION

One embodiment of the disclosed invention describes a method for calibrating a camera of an eye tracking system, the method comprising the steps of capturing an eye image of a user, wherein the eye image contains a plurality of glints created by a plurality of illuminators in the eye tracking system; detecting glints in the eye image; projecting illuminator positions onto the eye image to create expected glint positions; determining an angular offset between the expected glint positions and captured glint positions for corresponding pairs of expected and captured glint positions; determining the angular correction for the eye tracking camera using the determined angular offset angle; and applying the angular correction for the eye tracking camera to the eye tracker camera model.

In another embodiment the eye tracking system is contained within a head-mounted display device. Furthermore, the calibration steps may be repeated for every camera of the system, thereby calibrating all of the cameras of the system. In another embodiment the plurality of illuminators are disposed about a lens of the HMD. In a further embodiment, the detected glints are used to determine a model of the user's cornea. Furthermore, the illuminator positions are projected onto the model of the user's cornea to create expected glint positions.

Another alternative embodiment includes the steps of determining the center point of the expected glint positions to be used for the determining the angular offset of each glint from its corresponding expected glint position. Additionally, there may be an embodiment including the steps of calculating the median angular offset angle of the detected glints and using the median angular offset angle to determine the angular correction for the eye tracking camera.

In yet another alternative embodiment, the disclosed invention may contain an arrangement for calibrating a camera of an eye tracking system, the arrangement comprising the eye tracking system, having at least one eye tracking camera and a plurality of illuminators; and a calibration processor, being arranged to capture an eye image of the user, wherein the eye image contains a plurality of glints created by a plurality of illuminators in the eye tracking system, detect glints in the eye image, project illuminator positions onto the eye image to created expected glint positions, determine an angular offset between the expected the glint positions and captured glint positions for corresponding pairs of expected and captured glint positions, determine the angular correction for the eye tracking camera using the determined angular offset angle, and apply the angular correction for the eye tracking camera to the eye tracker camera model.

Another embodiment of the disclosed invention includes A non-transitory computer-readable storage medium storing instructions which, when executed by an eye tracking system cause the system to carry out the steps of capturing an eye image of the user, wherein the eye image contains a plurality of glints created by a plurality of illuminators in the eye tracking system, detecting glints in the eye image, projecting illuminator positions onto the eye image to create expected glint positions, determining an angular offset between the expected glint positions and captured glint positions for corresponding pairs of expected and captured glint positions, determining the angular correction for the eye tracking camera using the determined angular offset angle, and applying the angular correction for the eye tracking camera to the eye tracker camera model.

In a further alternative embodiment, the eye tracking system may be contained within a head-mounted display device, such as a VR/AR/XR headset, a peripheral device such as an eye tracker connected to a personal computer, or a headset device without a display, such as wearable eye tracking glasses.

BRIEF DESCRIPTION OF THE DRAWINGS

Specific embodiments will now be described in detail with reference to the accompanying drawings, in which:

FIG. 3 depicts a flowchart of a method according to the present disclosure.

DETAILED DESCRIPTION

As discussed above, significant cost savings will be realized with the elimination of per unit hardware calibration at the time of the manufacturing of eye tracking camera integrated devices, such as XR HMDs. By adopting the use of default camera models the problem will arise that the camera model be different for each individual HMD unit. The differences are because camera, lens and other hardware mounting tolerances are not ideal and will vary from unit to unit. Thus, the present invention seeks to create a dynamic calibration method that can compensate for production errors and mounting tolerances. Further advantages will also be realized from the described invention in that the method will improve the eye tracking signal accuracy by calculating and compensating for a per HMD camera rotation and compensate for changes in hardware and mounting that comes after a time, for example due to wear and tear of the HMD.

Figure 1:
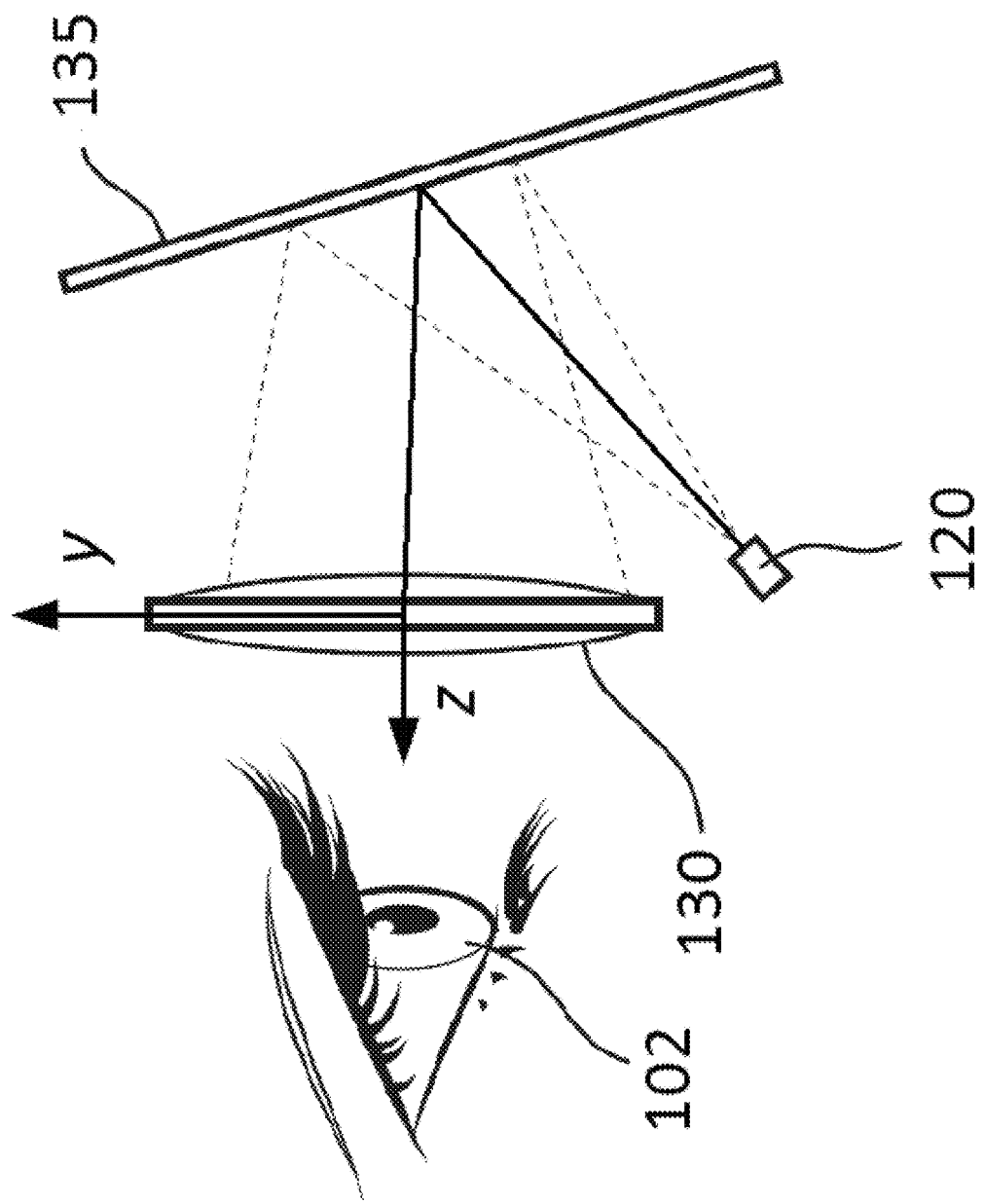
FIG. 1 depicts an eye of a user looking through a lens of an HMD with eye tracking integration.

FIG. 1 depicts an HMD device that has integrated eye tracking capabilities. The optical path from the user's eye 102 through the lens 130, hot mirror 135, to the eye tracking camera 120 are depicted. The initialization process of the HMD by the user will include the dynamic camera rotation calibration required by using a default camera model. In particular, the dynamic camera rotation calibration will look to compensate for rotation of the eye tracking camera 120 about the z axis along the optical path as shown in FIG. 1.

In order to find the rotational compensation, the eye tracking system will capture data so to build a model of the user's cornea. This is done by capturing an eye image while a plurality of illuminators (not shown in FIG. 1) create a pattern of glints in the user's cornea. While the method does not require the user to have their eye looking straight ahead, which normally occurs during routine eye tracking calibration, it will be understood to be preferable to use eye images where many glints are visible. The eye tracking system will then use the glint data to build a model of the user's eye. This model may be a three-dimensional model of the user's eye based upon the detected glint locations captured in the eye image. The methods for calculating the cornea position and shape are already well known in the field of eye tracking and will not need to be discussed further in this invention.

The default camera model will include default locations of the plurality of illuminators used in the particular eye tracking system the default camera model corresponds to. Using the default locations of the illuminators, the system overlays the illuminator positions over the eye image. This illuminator overlay projection may be performed using the cornea model. While in an optimal embodiment the eye tracking system will contain six or more illuminators per eye, it will be understood that the inventive system as a whole will function with at least two illuminators. The overlay projection is used by the system to determine the expected glint positions based on the default camera model.

Projecting, as discussed in this invention, means the process of using the default camera model to calculate where in the image something with known position in the world (the illuminators) would be visible. The default camera model is used to describe the relation between the image (2D) and the world (3D). It is understood by persons skilled in the art that the projecting step does not necessarily create an overlaid image as seen in FIG. 2, but rather may use computational methods, visual overlay methods, and other known ray tracing methods.

In order to determine the compensation required for the camera, the system will compare every observed glint position versus its corresponding expected glint position. This comparison provides an angular offset, wherein the angle is measured from the center point of the expected glint pattern. In order to ensure robustness of the system and reduce noise, outlier offset angles can be discarded by calculating median angle difference over the offset angles.

Figure 2:
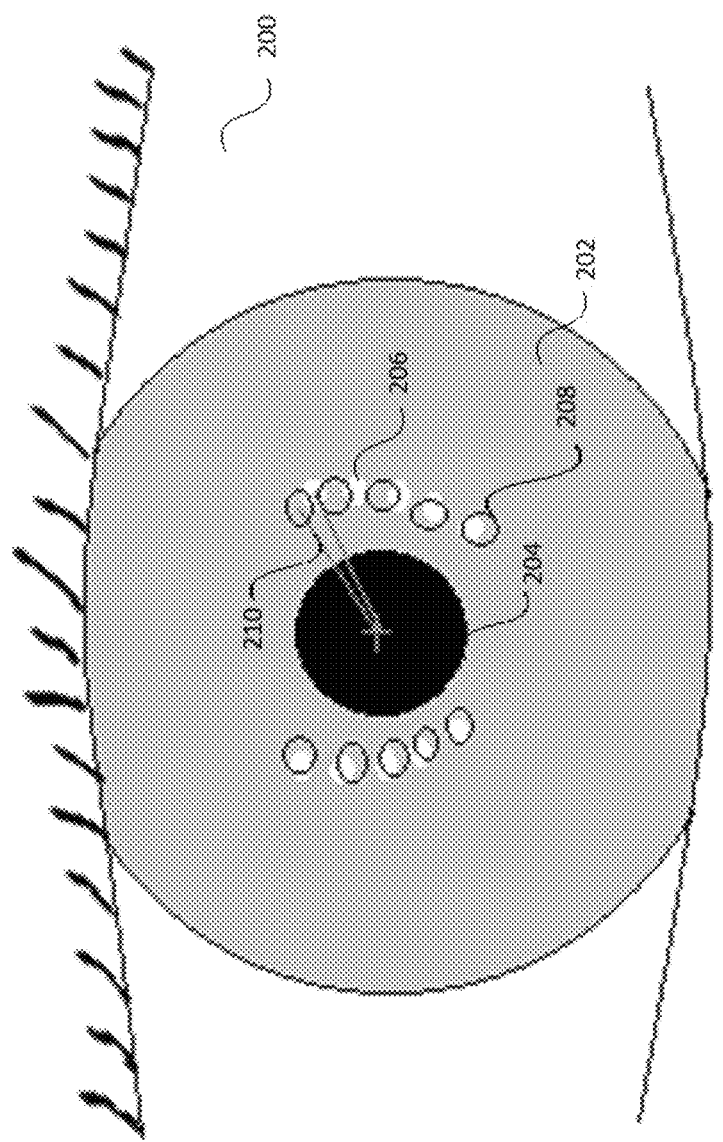
FIG. 2 is a depiction of an eye image with captured glints and overlayed expected glint positions.

FIG. 2 depicts an eye image with captured glints 206 and overlayed expected glint positions 208. In FIG. 2, the image of the eye of the user 200 has been captured by the eye tracking camera 120, wherein the user's pupil 204 is shown as well as the glints 206 that have been detected about the cornea 202 of the user. The detected glints 206 allow for the system to determine the position of the user's cornea, upon which the expected glints 208 are overlayed in the eye image. Using the center of the glint pattern (shown as a cross in the middle of the pupil 204) as the reference point, the glints 206 are compared with the expected glint positions 208 and an offset angle 210 is measured for each corresponding pair of detected glints 206 and expected glint positions 208.

Given the median offset angle, a camera angle correction will be determined and applied to the camera model. The updated camera model, therefore, will correct for any angular distortion from the eye tracking camera, thereby completing the camera rotation calibration. It is further contemplated that the camera rotation calibration process may be used beyond initialization of the eye tracking system, and it may be repeated after detected potential damage to the device, after a set period of time or upon the user's initiation.

FIG. 3 depicts a flowchart of the method steps to calibrate the eye tracking camera for updated camera model for a rotational distortion 300. Upon starting and initializing the system the eye tracking camera captures an eye image containing glints 310. The system then detects the glints in the eye image and determines the cornea position of the user 320. Using the cornea position and the default camera model illuminator positions, expected illuminator positions are determined for the camera 330. The system then compares the expected illuminator positions with the detected glints and an offset angle is measured between the corresponding pairs 340. Using the offset angle data, the system determines an offset camera angle correction and applies the correction to the camera model 350. After the camera model has been updated, the calibration process ends.

The invention claimed is:

1. A method for calibrating an eye tracking camera of an eye tracking system, the method comprising the steps of:
   a) capturing an eye image of a user, wherein the eye image contains a plurality of glints created by a plurality of illuminators in the eye tracking system,
   b) detecting glints in the eye image,
   c) projecting illuminator positions onto the eye image to determine expected glint positions,
   d) determining an angular offset between the expected glint positions and detected glint positions for corresponding pairs of expected and detected glint positions,
   e) determining the angular correction for the eye tracking camera using the determined angular offset angle, and
   f) applying the angular correction for the eye tracking camera to an eye tracker camera model.

2. The method of claim 1 wherein the eye tracking system is contained within a head-mounted display device, HMD.

3. The method of claim 2, wherein steps a-f are repeated for each eye tracking camera in the system.

4. The method of claim 2, wherein the plurality of illuminators are disposed about a lens of the HMD.

5. The method of claim 1, wherein the detected glints are used to determine the position of the user's cornea.

6. The method of claim 5, wherein the illuminator positions are projected onto the determined position of the user's cornea to determine expected glint positions.

7. The method of claim 1, further comprising the steps of determining a center point of the expected glint positions to be used for the determining the angular offset of each glint from its corresponding expected glint position.

8. The method of claim 1, further comprising the steps of calculating median angular offset angle of the detected glints and using the median angular offset angle to determine the angular correction for the eye tracking camera.

9. An arrangement for calibrating an eye tracking camera of an eye tracking system, the arrangement comprising:
the eye tracking system, having at least one eye tracking camera and a plurality of illuminators; and
a calibration processor, being arranged to:
 a) capture an eye image of the user, wherein the eye image contains a plurality of glints created by a plurality of illuminators in the eye tracking system,
 b) detect glints in the eye image,
 c) project illuminator positions onto the eye image to determine expected glint positions,
 d) determine an angular offset between the expected the glint positions and detected glint positions for corresponding pairs of expected and detected glint positions,
 e) determine the angular correction for the eye tracking camera using the determined angular offset angle, and
 f) apply the angular correction for the eye tracking camera to the eye tracker camera model.

10. The arrangement for calibrating an eye tracking camera of an eye tracking system of claim 9, wherein the eye tracking system is contained within a head-mounted display device, HMD.

11. The arrangement for calibrating an eye tracking camera of an eye tracking system of claim 9, wherein steps a-f are repeated for each eye tracking camera in the system.

12. The arrangement for calibrating an eye tracking camera of an eye tracking system of claim 10, wherein the plurality of illuminators are disposed about a lens of the HMD.

13. The arrangement for calibrating an eye tracking camera of an eye tracking system of claim 9, wherein the detected glints are used to determine the position of the user's cornea.

14. The arrangement for calibrating an eye tracking camera of an eye tracking system of claim 13, wherein the illuminator positions are projected onto the determined position of the user's cornea to determine expected glint positions.

15. The arrangement for calibrating an eye tracking camera of an eye tracking system of claim 9, wherein the calibration processor, being further arranged to determine the center point of the expected glint positions to be used for determining the angular offset of each glint from its corresponding expected glint position.

16. The arrangement for calibrating an eye tracking camera of an eye tracking system of claim 9, wherein the calibration processor, being further arranged to calculate the median angular offset angle of the detected glints and using the median angular offset angle to determine the angular correction for the eye tracking camera.

17. A non-transitory computer-readable storage medium storing instructions which, when executed by an eye tracking system cause the system to carry out the steps of:
 a) capturing an eye image of the user using an eye tracking camera, wherein the eye image contains a plurality of glints created by a plurality of illuminators in the eye tracking system,
 b) detecting glints in the eye image,
 c) projecting illuminator positions onto the eye image to determine expected glint positions,
 d) determining an angular offset between the expected the glint positions and detected glint positions for corresponding pairs of expected and detected glint positions,
 e) determining the angular correction for the eye tracking camera using the determined angular offset angle, and
 f) applying the angular correction for the eye tracking camera to the eye tracker camera model.

18. The non-transitory computer-readable storage medium storing instructions of claim 17, wherein the eye tracking system is contained within a head-mounted display device or within a peripheral device, or within a headset device.

* * * * *